(12) United States Patent
Burke

(10) Patent No.: US 8,249,411 B2
(45) Date of Patent: Aug. 21, 2012

(54) PORTABLE OPTICAL FIBER DISTRIBUTION ENCLOSURE

(75) Inventor: Edward J. Burke, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 355 days.

(21) Appl. No.: 12/765,600

(22) Filed: Apr. 22, 2010

(65) Prior Publication Data

US 2011/0262094 A1    Oct. 27, 2011

(51) Int. Cl.
  *G02B 6/00*    (2006.01)
(52) U.S. Cl. ....................................................... 385/135
(58) Field of Classification Search ........... 385/134–137
  See application file for complete search history.

(56) References Cited

U.S. PATENT DOCUMENTS

| | | | |
|---|---|---|---|
| 3,952,908 | A | 4/1976 | Carson |
| 4,163,503 | A | 8/1979 | McKinnon |
| 5,007,701 | A | 4/1991 | Roberts |
| 5,069,516 | A | 12/1991 | Kohy et al. |
| 5,210,374 | A | 5/1993 | Channell |
| 6,401,400 | B1 | 6/2002 | Elliott |
| 6,899,240 | B2 | 5/2005 | Dang et al. |
| 7,239,789 | B2 | 7/2007 | Grubish et al. |
| 7,353,602 | B2 | 4/2008 | McCullough et al. |
| 7,376,325 | B1 | 5/2008 | Cloud et al. |
| 7,381,888 | B2 | 6/2008 | Burke et al. |
| 7,385,137 | B2 | 6/2008 | Burke et al. |
| 7,547,051 | B2 | 6/2009 | Burke et al. |
| 2005/0207711 | A1 | 9/2005 | Vo et al. |
| 2011/0168716 | A1 | 7/2011 | Stransky et al. |

FOREIGN PATENT DOCUMENTS

| | | |
|---|---|---|
| WO | WO 2006/096839 A1 | 9/2006 |
| WO | WO 2006/127457 A1 | 11/2006 |

OTHER PUBLICATIONS

The International Search Report and the Written Opinion of the International Searching Authority dated Jul. 21, 2011, for International Application No. PCT/US2011/033036, Filed Apr. 19, 2011.

*Primary Examiner* — Uyen Chau N Le
*Assistant Examiner* — Michael Mooney
(74) *Attorney, Agent, or Firm* — Christie, Parker & Hale, LLP

(57) ABSTRACT

An underground utility enclosure assembly with a sealed fiber distribution enclosure includes a grade level box and a removable cover that mounts to the box. The cover includes a removable plug that provides access to the interior of the box. A removed plug area in the cover allows access to utility cables contained in the box and access to the interior of the sealed fiber distribution enclosure mounted to the open plug area. The bottom of the enclosure includes a rigid lower base frame assembly that removably attaches to the open plug area, and an above-ground fiber distribution base structure affixed to a cable opening passing through the base frame assembly. The sealed fiber distribution enclosure can be removed as a unit from the cover on the grade level box, with active cables undisturbed, and moved to a remote site for making above-ground fiber optic cable splices. The sealed fiber distribution enclosure then can be re-installed in the cover plate, with the active cables undisturbed.

14 Claims, 12 Drawing Sheets

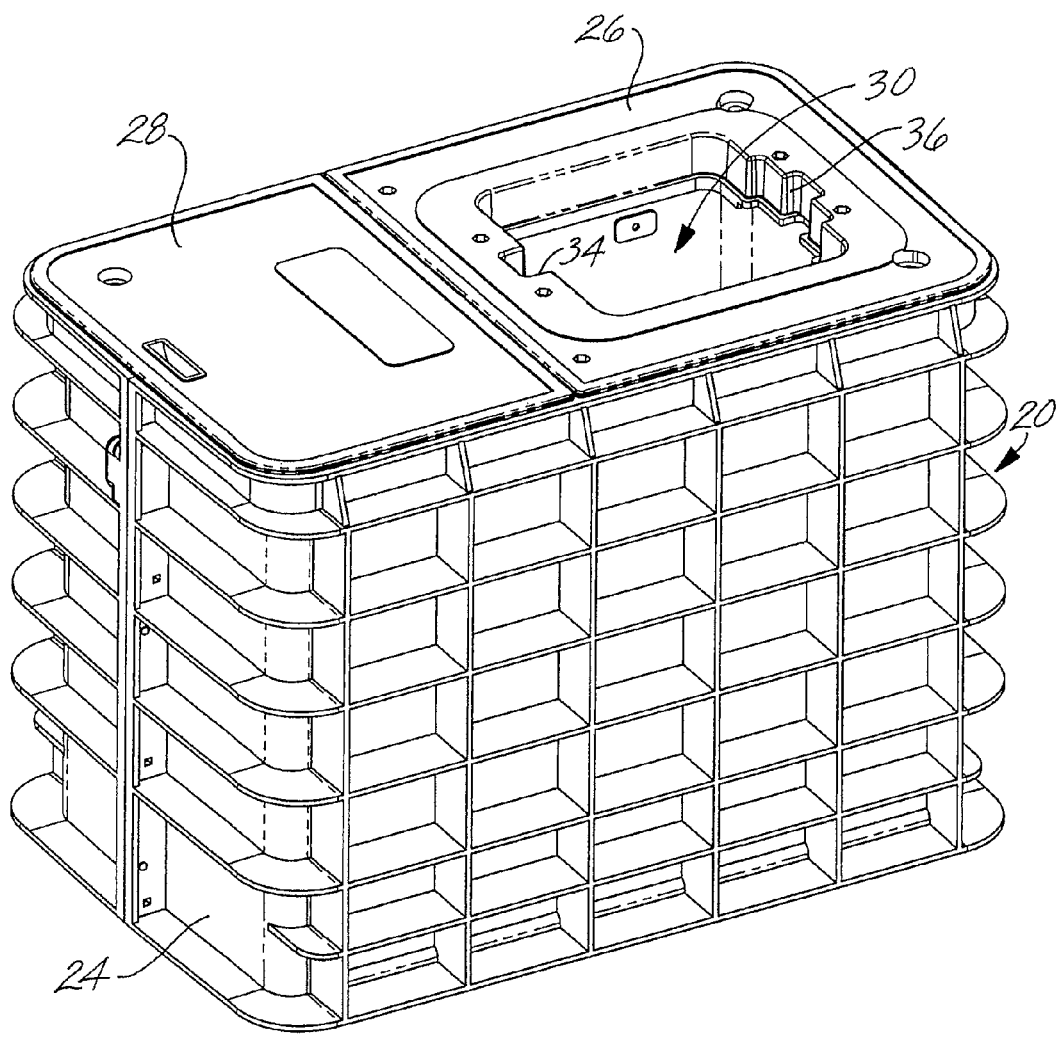

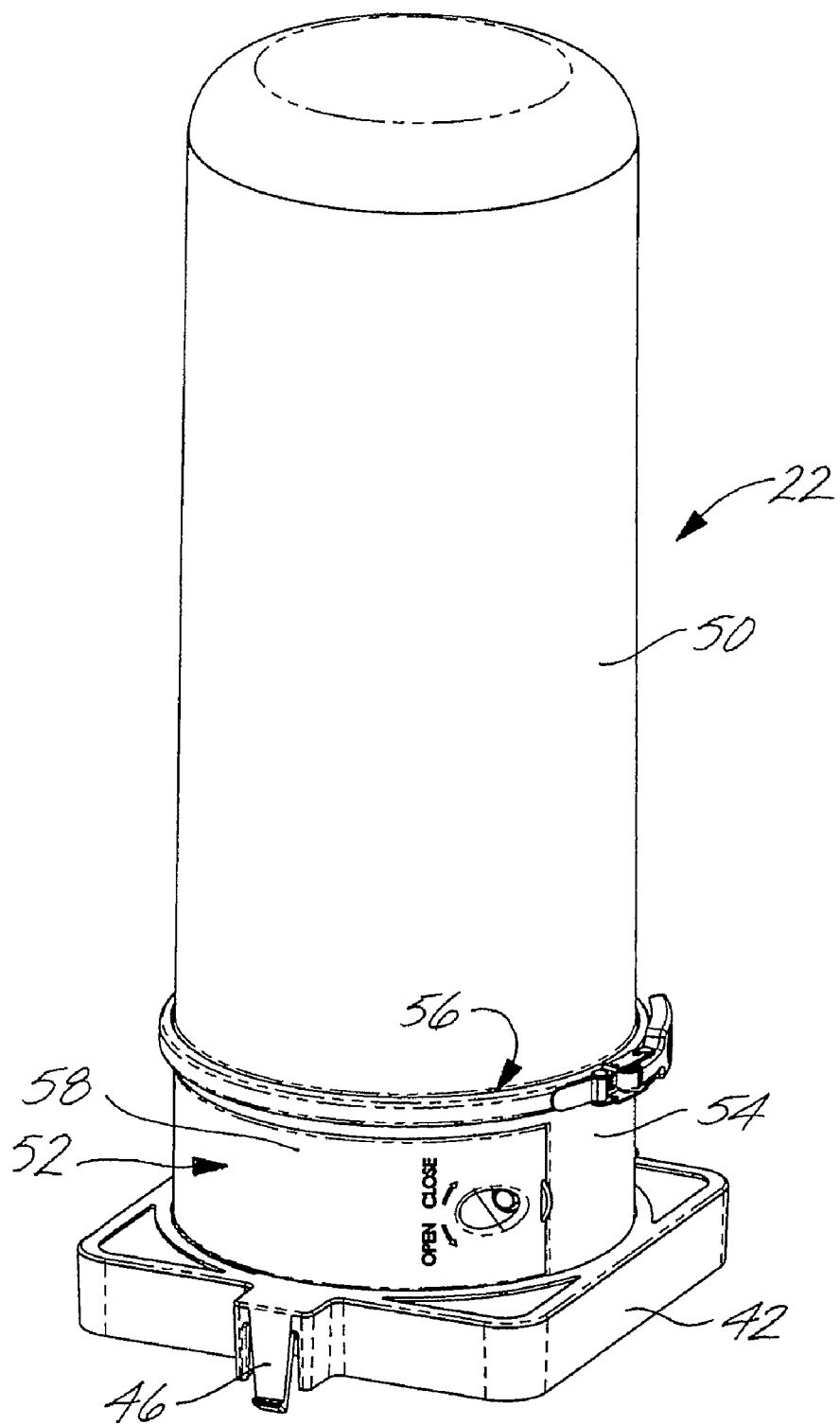

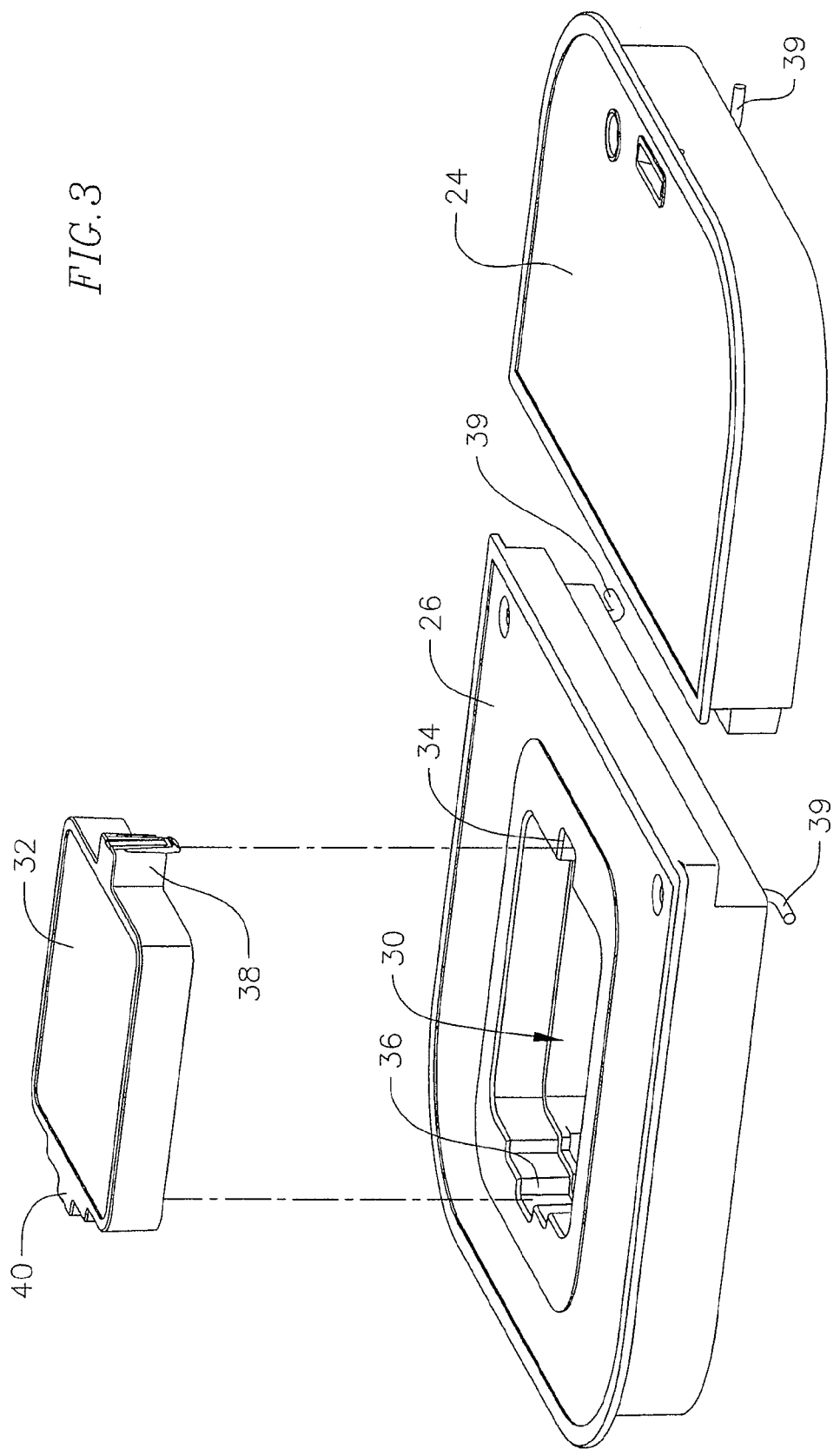

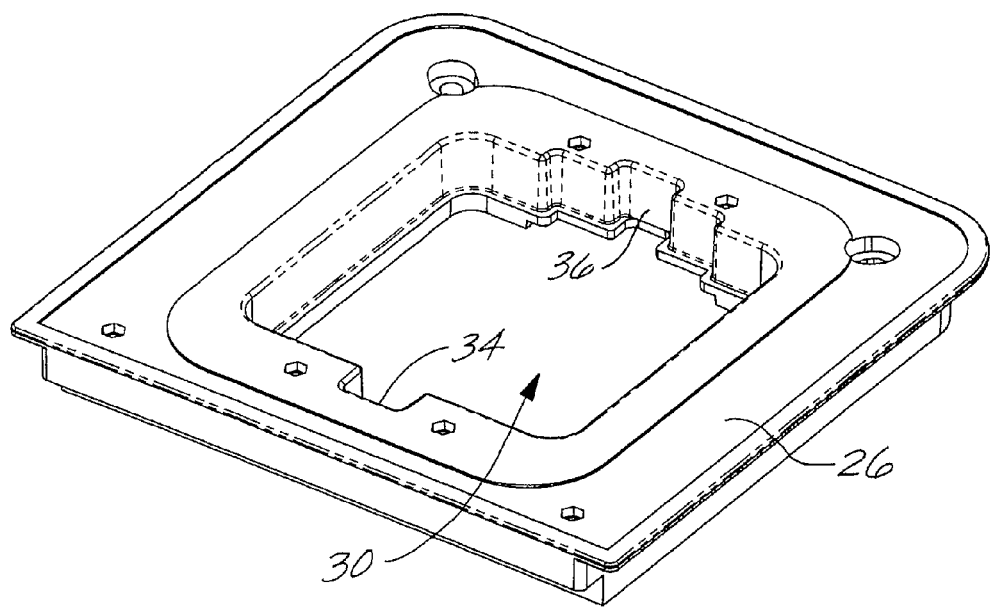

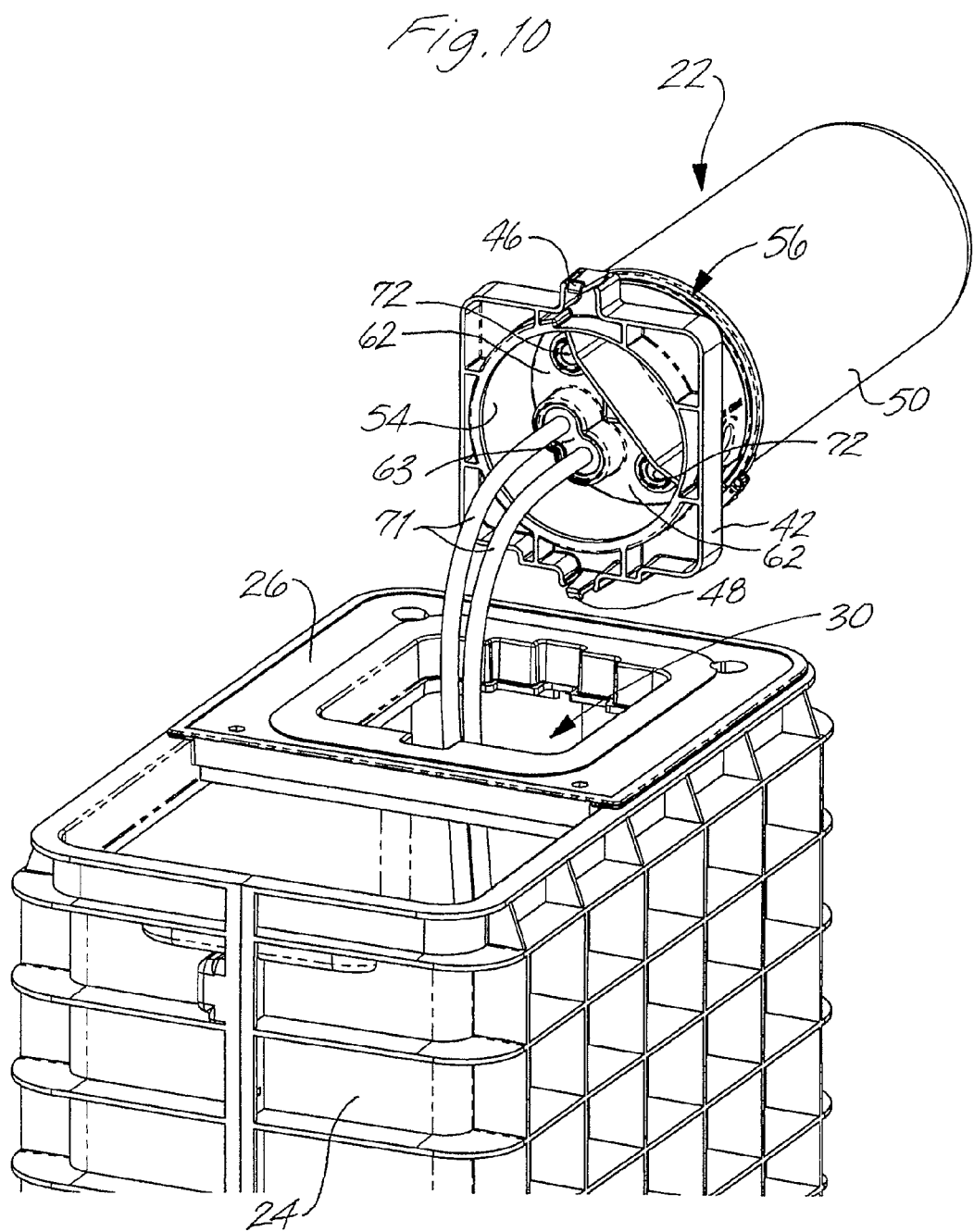

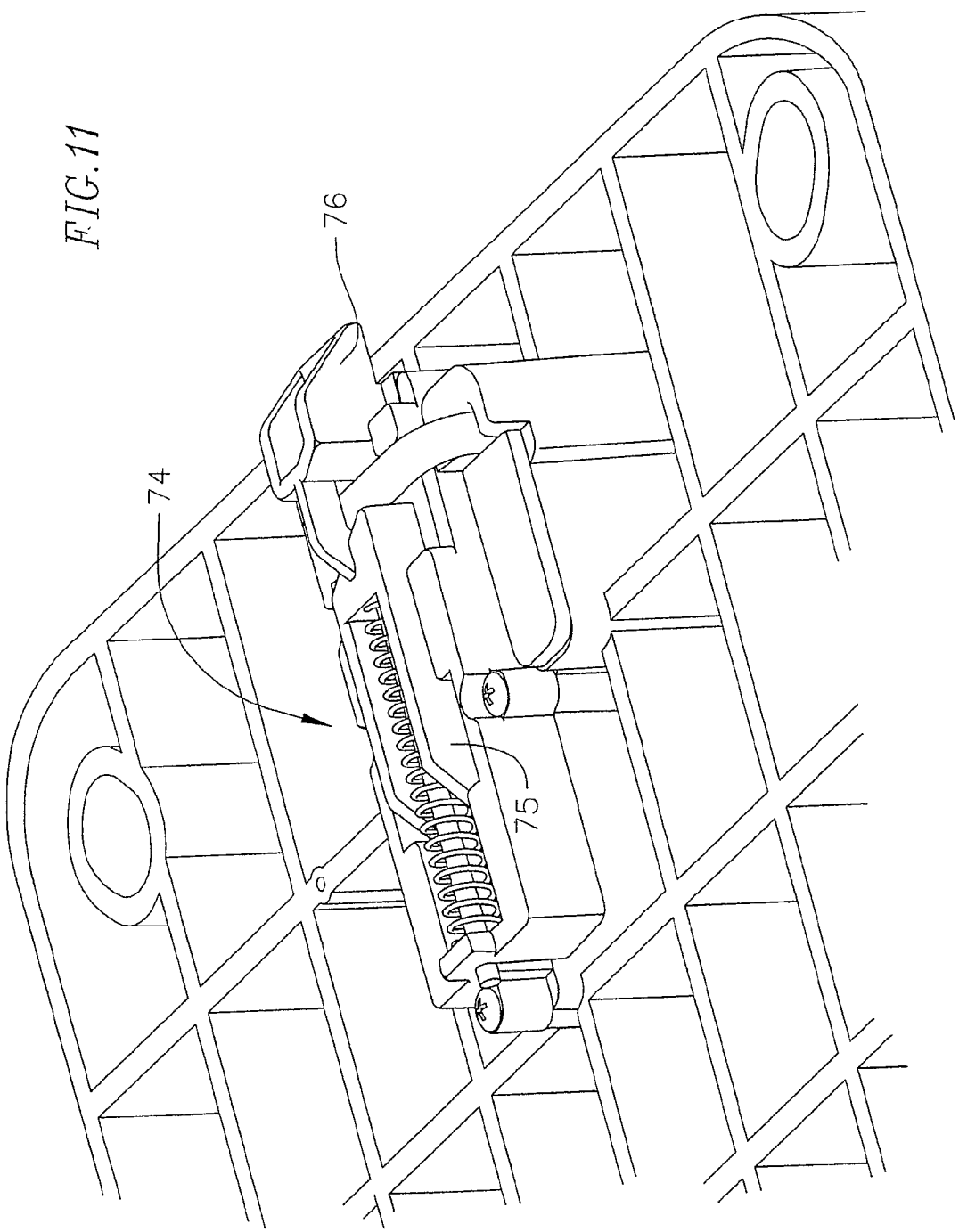

PORTABLE OPTICAL FIBER DISTRIBUTION ENCLOSURE

BACKGROUND

The present invention relates to an enclosure system for underground utility cables which are brought above-ground for hook-ups and cable splices made to a distribution assembly contained in an above-ground utility enclosure. Routine network, maintenance and customer service hook-ups can often be made without removing the utility distribution assembly from its connection to a grade level box that contains the utility cables. These cables can include separate fiber optic cables which, because of their optical properties, are more complex in making spliced connections when compared with prior art metal wire cable splices.

One embodiment of the present invention provides a fiber distribution enclosure which is well suited for making routine hook-ups and service connections at ground level, but it is also able to provide an improved fiber distribution system that facilitates making the more complex fiber splices more efficiently, by allowing movement of the sealed distribution enclosure with cables attached.

SUMMARY

Briefly, one embodiment of this invention comprises an underground grade level box having an above-ground pedestal-type fiber distribution enclosure containing a fiber distribution assembly and a removable sealed outer cover. A two-piece split cover plate is removably mounted to the top of a grade level box. A removable plug in one section of the split cover plate attaches to a plug opening in the cover plate section. Removing the plug exposes a plug opening for access to underground utility cables contained in the grade level box. The plug opening also provides a mounting base for the sealed above-ground fiber distribution enclosure unit which includes a rigid base frame assembly that removably attaches to the plug opening. The base frame assembly comprises a lower section of the fiber distribution enclosure unit. The base frame assembly supports an upright fiber distribution enclosure assembly which includes a rigid mounting frame and one or more optical fiber splice trays secured to the mounting frame. The base frame assembly also includes separate sealed holes for passing a main utility cable and multiple optical fiber cables from inside the grade level box into the interior of the sealed fiber distribution enclosure. The sealed fiber distribution enclosure unit can be removed from the plug opening in the cover plate, with active cables undisturbed, and the entire unit can be moved to a remote site for making above-ground fiber optic cable splices or modifications. The fiber distribution assembly, with its newly spliced contacts, then can be re-installed, with the active cables undisturbed, by attaching the base frame assembly to the plug opening in the cover plate of the grade level box.

These and other aspects of the invention will be more fully understood by referring to the following detailed description and the accompanying drawings.

BRIEF DESCRIPTION OF THE DRAWINGS

FIG. 1. is a perspective view showing a grade level box and a lid or cover plate which, in one embodiment, comprises a split cover plate with one of the plate sections having an access opening.

FIG. 2. is a perspective view showing a fiber distribution enclosure assembled into a plug base adapted to be snap-locked into the access opening above the grade level box.

FIG. 3 is a perspective view showing the two sections of the split cover plate embodiment and a removable plug that snap-locks into the access opening to provide a flat traction surface in the absence of the pedestal-type enclosure.

FIG. 4 is a perspective view showing a detailed configuration of the pedestal mounting section and access opening on one side of the split cover plate.

FIG. 10 is a perspective view showing the sealed fiber distribution enclosure unit, with active cables attached, removed from the access opening in the grade level box.

FIG. 11 is a perspective view showing a self-latching lock contained on the underside of one of split cover plates.

DETAILED DESCRIPTION

Figure 5A:
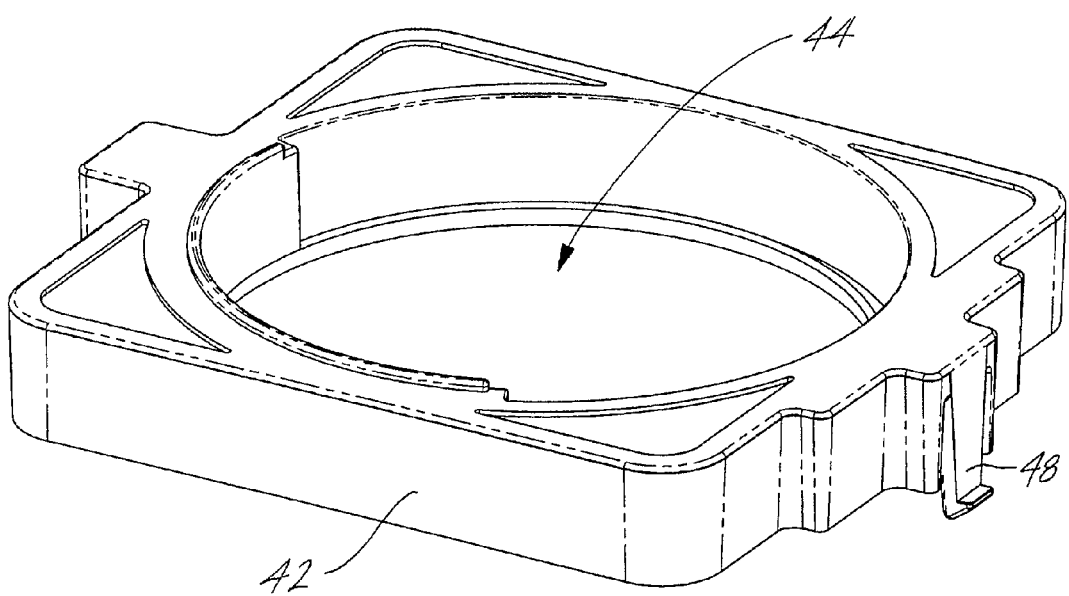
FIG. 5A is a perspective view showing a rigid lower base frame that snap-locks into the access opening to provide one section of a base frame assembly for receiving the pedestal-type enclosure.

Referring to FIGS. 1-4, the present invention provides an underground utility enclosure 20 having an above-ground fiber distribution assembly contained in an above-ground pedestal-type sealed fiber distribution enclosure unit 22. The invention is especially adapted for a grade level box 24 that contains underground utility cables which can include fiber optic cables. In one embodiment, the grade level box has a removable split cover plate comprising a two-piece lid that mounts to the top of the box. The split cover plate has a pedestal mounting section 26 and a separate cover section 28. The two sections interlock to normally provide a flat traction surface atop the grade level box.

The pedestal section of the split cover plate mounts the sealed fiber distribution enclosure unit 22 over an access opening 30 (also referred to as a plug opening) in the pedestal section. The enclosure unit 22 protects the underground utility cables when they are brought above-ground through the access opening and into the enclosure.

The pedestal mounting section 26 of the split cover plate also includes a removable plug 32 which, in one embodiment, snap-locks into the access opening (also referred to as a plug opening) in the pedestal section 26 of the cover plate. The plug is kept in place to provide a flat traction surface at ground level when the pedestal enclosure is not positioned over the grade level box.

The grade level box 20 has a hollow interior region for containing the below-ground electrical utility cables. In one embodiment, the box stores an elongated main cable and fiber optic cables used in making splice connections in the above-ground pedestal enclosure, by a method described below. The main cable and the fiber optic cables have a large amount of slack so they can extend away from their underground location to a remotely located work site.

The access opening 30, in one embodiment, includes notched regions 34, 36 of different profiles at opposite ends of the opening. The opposite ends of the removable plug 32 have outwardly projecting bendable clips 38, 40 formed so as to match the configurations of the notched regions 34, 36 in the access opening 30. The clips snap-lock the ends of the plug 32 into the corresponding notched regions of the access opening to form the continuous flat grade level traction surface on the grade level box 24. A special tool can be used to remove the plug, to open the access opening. The plug 32 can be removed via access provided by first removing the cover plate section 28 from the top of the grade level box. The bendable clips represent one of several different methods of removably attaching the plug to the access opening 30.

More detailed features of the grade level box, its split cover plate, and the removable plug are described in U.S. Pat. No. 7,385,137, which is incorporated herein in its entirety by this reference.

FIG. 3 also illustrates one embodiment of a locking system for closing and locking the lid on the grade level box. In the illustrated embodiment, L-bolts 39 are rotated between locked and unlocked positions, and described in more detail in U.S. Pat. No. 7,547,051, incorporated herein in its entirety by this reference.

Figure 5B:
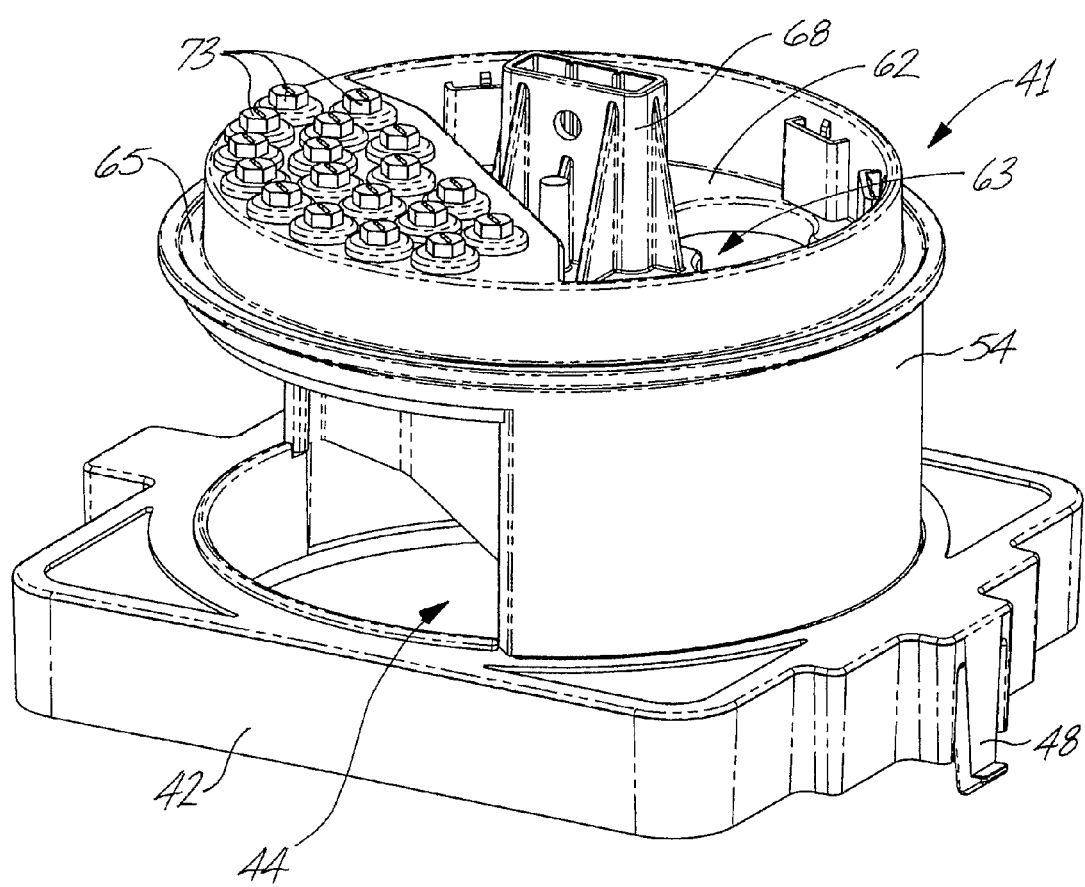
FIG. 5B is a perspective view showing the rigid base frame assembly which comprises a lower base ring affixed to an opening in the base frame.

The sealed fiber distribution enclosure unit 22, shown in FIG. 2, is mounted in the access opening 30 of the split cover plate when the plug 32 is removed. Referring to FIGS. 5A and 5B, the sealed fiber distribution enclosure unit 22 includes a base frame assembly 41 at the bottom of the enclosure. The base frame assembly 41 includes a rigid lower base frame section 42 that removably attaches to the plug opening 30. The lower base frame section includes a round central opening 44, which is one embodiment of various openings, extending through the frame. (The opening 44 also is referred to herein as a cable opening.) Bendable clips 46, 48 on opposite ends of the lower base frame section are adapted to snap-lock the base frame section 42 into the plug opening 30 in the split cover plate. The lower base frame section, in part, supports the sealed fiber distribution enclosure system 22, as shown best in FIG. 2, for positioning the enclosure above the grade level box while providing access to the interior of the grade level box through the central opening 44 in the lower base frame section 42. The bendable clips 46, 48 are one embodiment of various methods of removably attaching the base frame 42 to the plug opening 30. Other variable attachment means include bolts or latches, for example.

In use, the lower base frame section 42 embodiment shown in FIG. 5A is adapted to be snap-locked into the plug opening 30 by simply forcing it down into the opening after aligning the bendable clips 46, 48 with the corresponding profiled notched regions 34, 36 of the plug opening. The base frame assembly 41 can be removed from the plug opening, along with the entire sealed fiber distribution enclosure unit 22, by removing the clips (or other attachment means) from the locked position in the plug opening in a manner similar to removing the plug that was originally attached to the split cover plate.

The base frame assembly 41 also includes a rigid lower base ring 54 affixed to the opening 44 in the lower base frame section 42. (The lower base ring 54 is part of an assembly referred to herein as an above-ground lower base structure.) As shown best in FIG. 2, the sealed fiber distribution enclosure unit 22 includes an outer cover 50 removably secured to the rigid lower base ring 54 which is positioned above ground level in the lower base frame section 42. An O-ring and an outer cover clamp assembly 56 releasably secure the bottom of the cover 50 to the lower base ring 54 in a water-tight seal. The lower base ring also includes a rounded access door 58 removably secured to a face of the ring 54 so that the interior of the grade level box and the sealed fiber distribution enclosure unit 22 can be accessed (from above ground) by removing or opening the door. When the fiber distribution enclosure unit 22 is positioned in the split cover plate, the access door 58 is accessible and positioned above ground level. A special lock is used for opening the door to gain access to the interior of the grade level box through the opening in the base frame.

Figure 6:
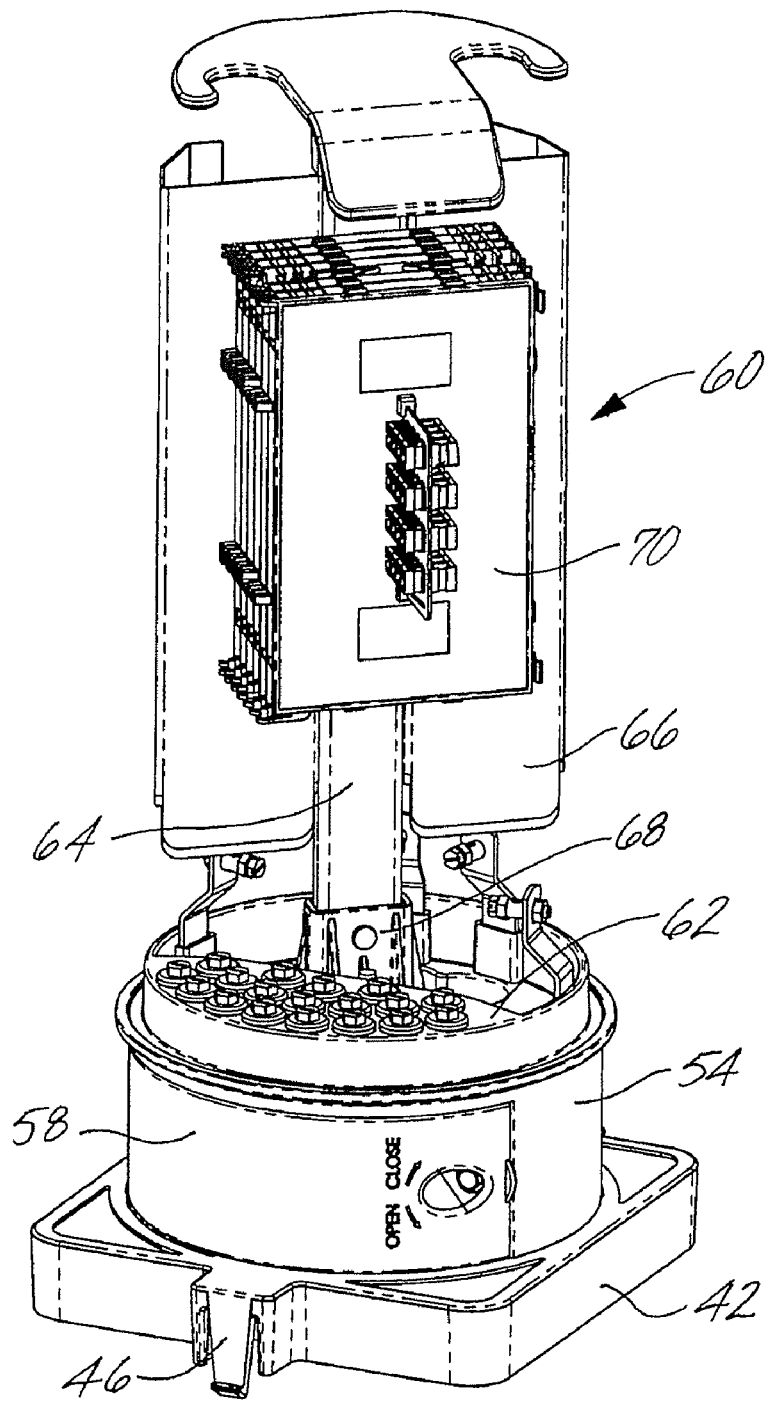
FIG. 6 is a perspective view showing the interior of the fiber distribution enclosure with its cover removed, showing a support bracket for fiber splice trays mounted above an interior base structure that receives a main cable and optical fiber cables for connection to the fiber splice trays.
Figure 7:
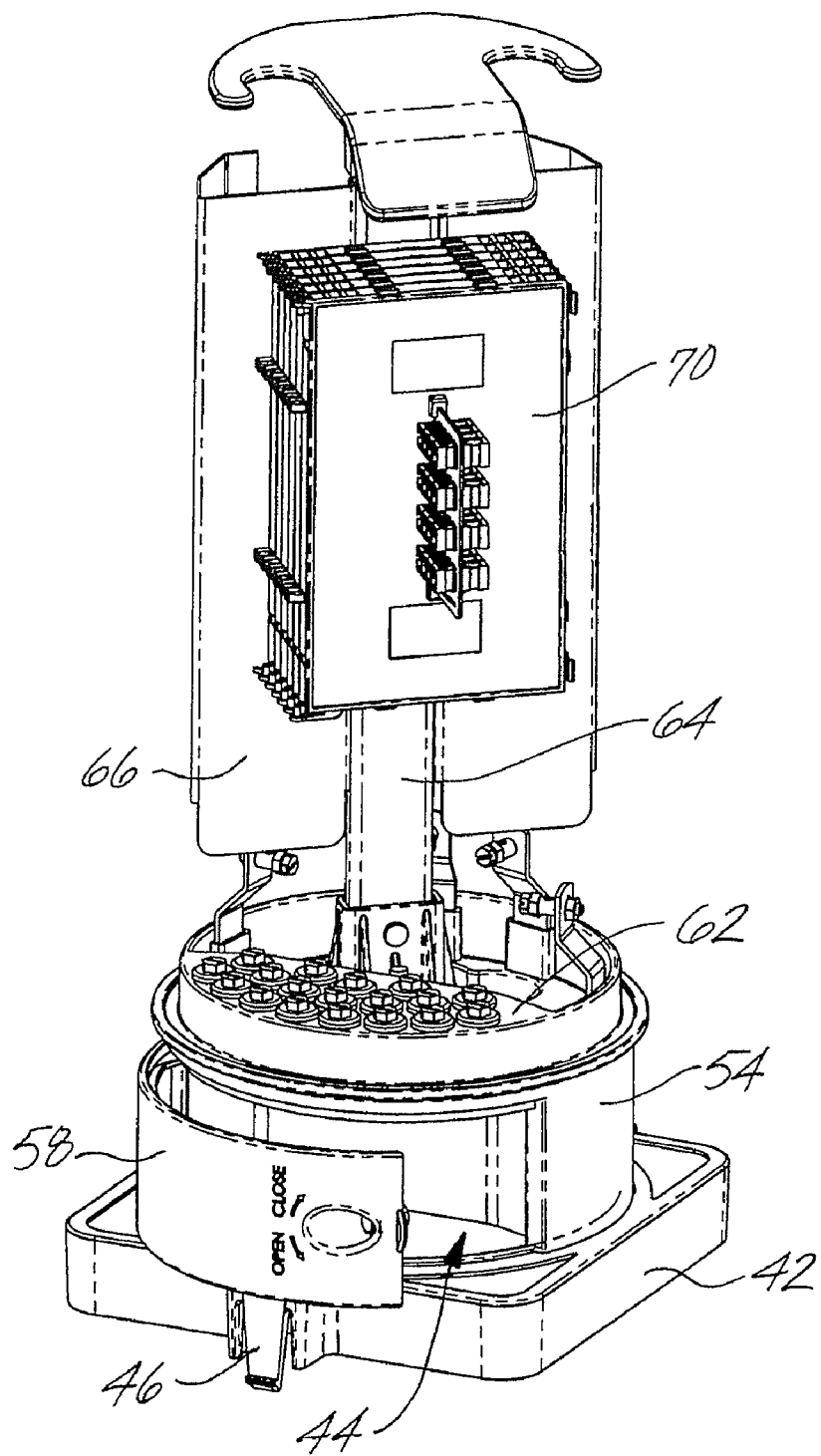
FIG. 7 is a perspective view similar to FIG. 6 but showing the interior base with its door removed for providing access to fiber access openings containing grommets in the pedestal interior base structure.
Figure 8:
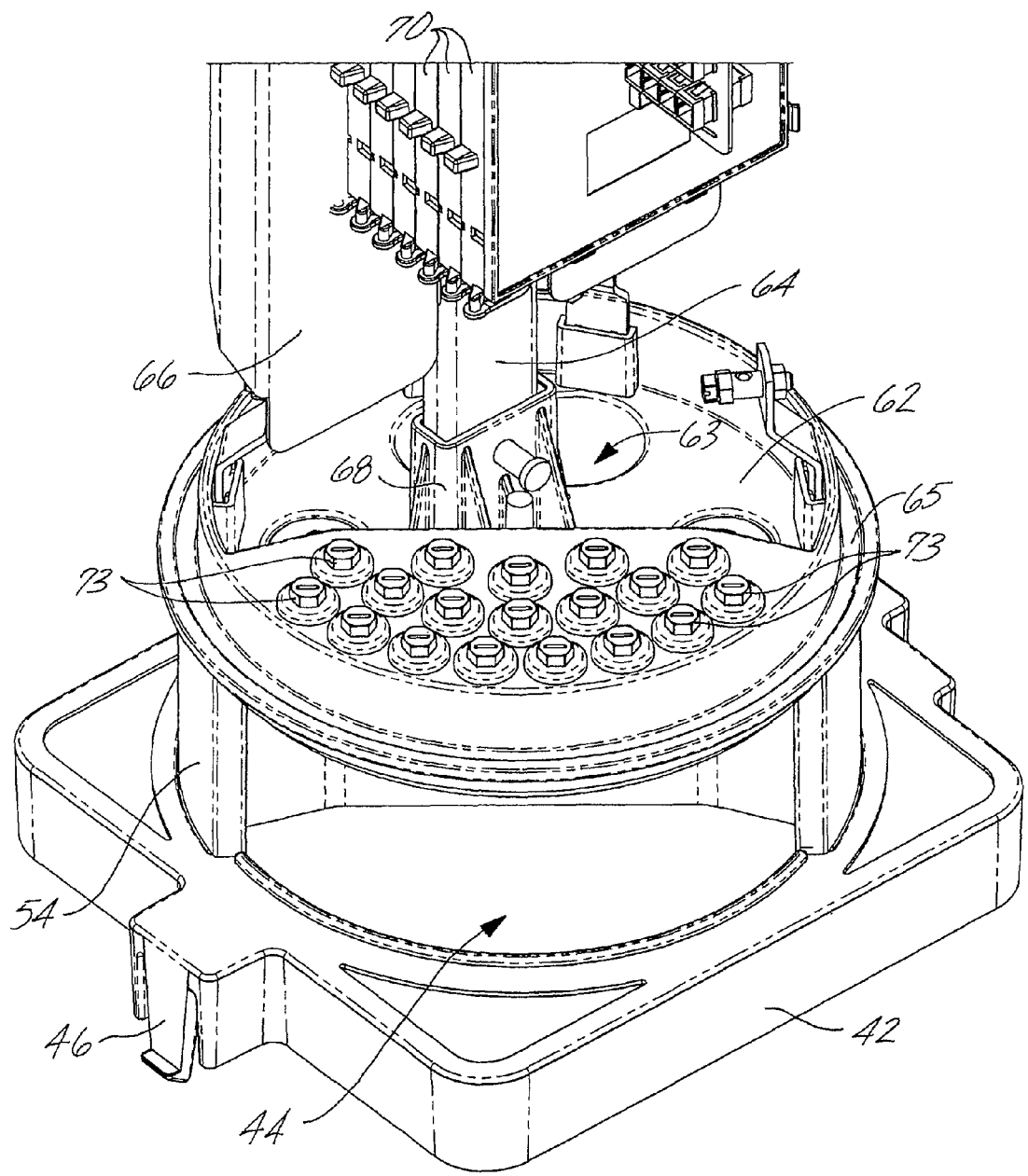
FIG. 8 is an enlarged perspective view showing the pedestal base in preparation for installation of an optical fiber cable.
Figure 9:
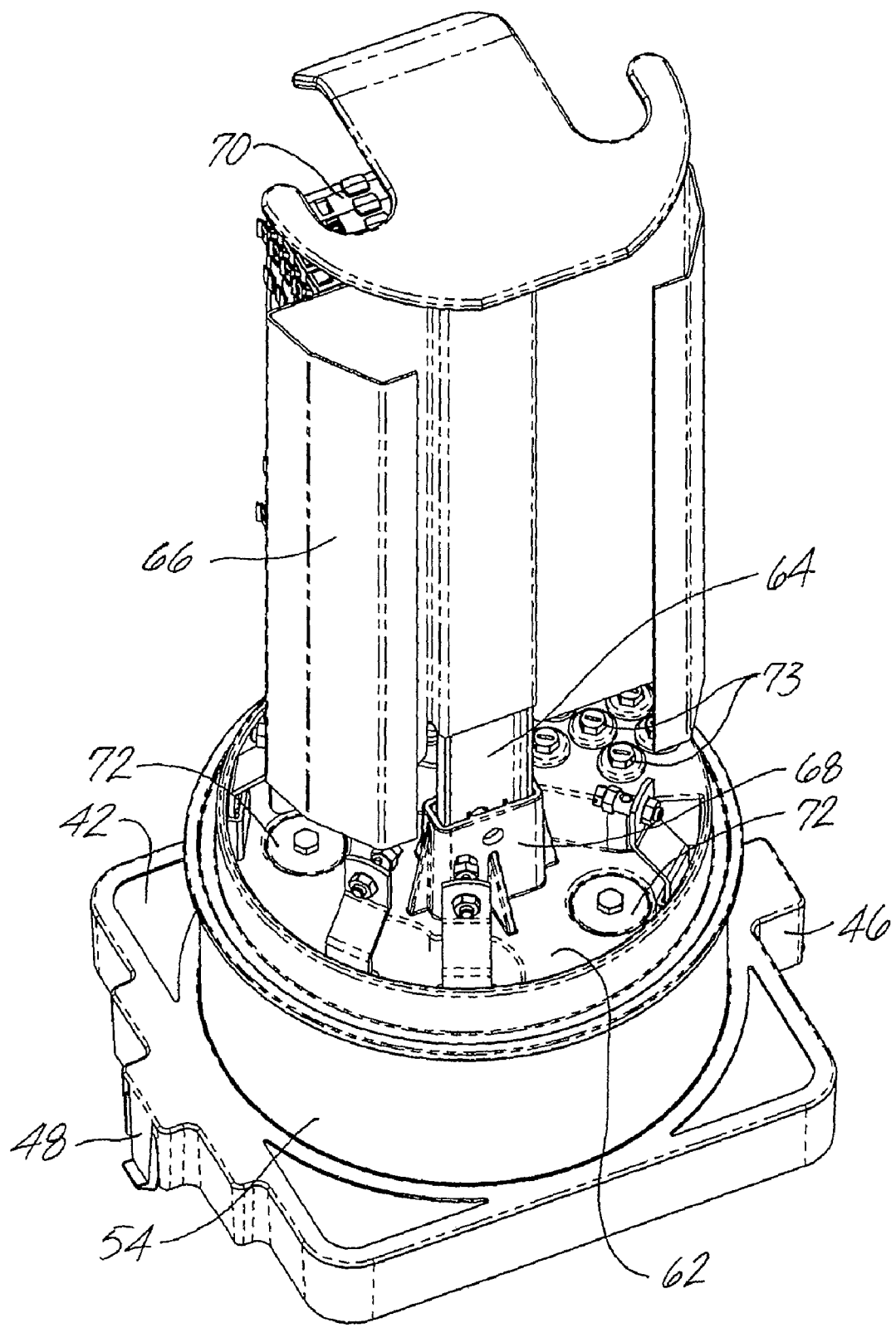
FIG. 9 is a perspective view showing a rear side of the assembly shown in FIG. 8.

FIGS. 6 and 7 illustrate components of a fiber distribution enclosure assembly 60 contained in the sealed fiber distribution enclosure unit 22. FIG. 6 shows the assembly with the access door 58 on the base ring 54 in its closed position. FIG. 7 shows how access can be gained to the interior of the grade level box, and also to the fiber distribution enclosure assembly, with the door moved to its opened position.

The lower base ring 54 and the lower base frame section 42 are preferably made separately by plastic molding techniques and then affixed to one another to form the lower section components of the base frame assembly 41. The lower base ring 54 can be affixed to the cable opening 44 in the base frame 42 by various techniques, including adhesively bonding the base ring to the opening in the lower base frame section. Other attachment techniques can be used, such as using mechanical fasteners or bolts, a snap-lock means of engagement, or heat shrinking. Exterior adhesive-type seals, such as grouting also can be used.

FIGS. 6 through 9 show the fiber distribution enclosure assembly 60 contained inside the pedestal-type sealed enclosure having been exposed by removing the O-ring clamp 56 at the base of the cover 50 and sliding the outer cover 50 off over the interior assembly.

The fiber distribution enclosure assembly 60 is supported above-ground on a section of the lower base frame assembly that includes a base plate 62 that separates the interior of the enclosure from the interior of the grade level box. The base plate 62, which is best shown in FIG. 5B, is affixed to a supporting rim inside an upper portion of the base ring 54. (The lower base ring 54 and its base plate 62 are part of the assembly referred to herein as an above-ground lower base structure.) The base plate 62 includes sealed holes for use in passing a main cable and separate optical fiber cables through the base plate to the fiber distribution assembly. In one embodiment, the base plate 62 can include a grommet 63 in a 1.5-inch figure-eight shaped hole for providing a seal to a pair of main cables, two 1.5-inch round grommet holes, and sixteen 0.75-inch grommet holes which are plugged. The plugs are removable from the holes.

The lower base ring 54 also includes an annular upwardly facing outer rim 65 that seats the rounded bottom of the outer cover 50 when the cover is clamped and sealed to the base frame assembly.

The fiber distribution assembly includes a molded plastic socket 68 affixed to the base plate 62 for supporting an upright rigid support bar 64. A back plate 66 is affixed to the support bar 64. Various support structures can be used for cables passing through holes in the base plate containing plugs that seal off the distribution assembly from the interior of the grade level box.

A plurality of fiber splice trays 70 are mounted to the back plate. The fiber splice trays can comprise any of various devices to manage the network and which can be opened to provide a means of facilitating the optical network.

The interior of the fiber distribution enclosure assembly 60 also can include cable supports, grounding bars, and any other items that facilitate making required connections between the utility cables contained in the grade level box and the fiber splice trays or other means for making splice connections or modifications in the interior of the enclosure.

In use, as shown best in FIG. 10, the sealed fiber distribution enclosure unit 22 can be removed as a unit from the cover plate 26 of the grade level box with active cables undisturbed. The enclosure is shown in a position removed as a sealed unit from the plug opening 30 in the grade level box. A pair of main fiber optic distribution cables 71 are brought above-ground from inside the grade level box to the sealed fiber distribution enclosure unit. These main fiber optic distribution cables can be taken from the long main underground fiber optic distribution cables coiled inside the grade level box. The sealed fiber distribution enclosure unit also contains mid-sized holes (shown with sealed plugs 72) for sealing to branch cables, for example. The branch cables are not shown in FIG. 10 for clarity. In addition, the multiple set of smaller holes and plugs 73 (see FIG. 5B) contained in the lower base plate 62 provide a sealed passageway for optical fiber extension cords (also not shown for clarity) or other smaller-diameter optical fiber cables brought from below-ground to the above ground sealed unit.

The sealed fiber distribution enclosure unit can be taken to a remote work site, such as a special trailer or van or other facility where fiber splices can be made to any of the various components contained in the fiber splice trays 70. The remote site provides a working environment that can enhance the quality of the fiber splice connections. This can include a low humidity clean environment where the fiber splices can be made by glass fusion processing techniques that also require careful handling of the optical fiber cables.

Following the fiber splicing or modifications at the remote site, the fiber splice trays can be closed and sealed, and the fiber distribution enclosure assembly then may be returned as a unit, with active cables undisturbed, to the grade level box where the lower base frame assembly of the enclosure is or can be re-installed in the plug opening in the cover plate. In one embodiment, the fiber distribution enclosure assembly and the base frame assembly can be returned as a sealed unit for installation in the plug opening in the cover plate.

FIG. 11 shows the underside of one of the split cover plates which includes a bolt-activated self-latching locking assembly 74 that can be used for securely closing the cover plate to the top of the grade level box. The self-latching lock includes a slide member 75 which engages an abutment on the inside of the grade level box when the lid or cover plate is forced down over an opening in the grade level box, such as by foot pressure. The downward force on the lid causes the latch 76 to retract against a spring bias and then snap-lock the latch into a locking position. The latch can be accessed from outside the lid with a special tool for removing the lid from the grade level box. Further details of the self-latching lock mechanism, which is one of a variety of latching devices that can be used for this invention, is disclosed in U.S. patent application Ser. No. 12/372,654, filed Feb. 17, 2009, incorporated herein in its entirety by this reference.

What is claimed is:

1. An underground utility enclosure assembly adapted for making remote fiber optic cable splices, the utility enclosure assembly comprising:
   a grade level box containing below-ground fiber optic cables stored in a slack condition;
   a cover plate on the grade level box, a section of the cover plate including a plug opening;
   a base frame assembly removably mounted as a unit in the plug opening, the base frame assembly comprising:
   (1) a lower base frame section having a profile that removably fits into the plug opening, the lower base frame section having a cable opening therein aligned with the plug opening in the cover plate, and bendable clips on the lower base frame section that unlock the lower base frame section from and snap-lock the section into the plug opening,
   (2) an above-ground lower base structure rigidly affixed to the lower base frame section, the lower base structure positioned above the cable opening in the lower base frame section,
   (3) a base plate rigidly affixed to an upper portion of the lower base structure and spaced above the cable opening, and
   (4) a plurality of sealed openings in the base plate for providing sealed passage of active fiber optic cables passing from the grade level box and through the cable opening in the lower base frame section;
   the utility enclosure assembly further comprising:
   an upright rigid support bar removably secured to the base plate on a side thereof opposite the cable opening;
   an optical fiber splicing device carried on the upright support bar to facilitate joining optical fibers contained in selected ones of the active cables; and
   an outer cover adapted for removably fastening to the lower base structure for providing a sealed interior region for containing the active cables and the optical fiber splicing device;
   the lower base frame section adapted to unlock from its position in the plug opening for use in removing the base frame assembly as a unit from the plug opening, with the active fiber optic cables undisturbed, to facilitate transporting the base frame assembly and the optical fiber splicing device to a remote work site for use in making above-ground optical fiber splice connections to the active cables passing from a slack condition in the grade level box, through the lower base structure, and to the optical fiber splicing device;
   the base frame assembly and the optical fiber splicing device adapted to be transported away from the work site as a unit, with the active cables undisturbed, and repositioned in the plug opening by snap-locking the lower base frame section thereof into the plug opening in the cover plate.

2. The assembly according to claim 1, in which the cover plate is a split cover plate.

3. The assembly according to claim 1, in which the fiber optic cables include a main distribution cable and a smaller-sized optical fiber cable both spliced together in the optical fiber splicing device.

4. The assembly according to claim 1, in which the lower base structure includes an access door above the cable opening and below the base plate to provide access to the cable opening in the lower base frame section and to the sealed openings in the base plate.

5. The assembly according to claim 1, in which the lower base frame section is a one-piece unit.

6. The assembly according to claim 1, in which the base plate includes a socket for removably receiving the support bar.

7. A fiber distribution enclosure unit adapted for making remote fiber optic cable splices after having been removed from a plug opening in a cover plate of a grade level box that provides access to below-ground fiber optic cables stored in a slack condition in the grade level box, the fiber distribution enclosure unit comprising:

a base frame assembly removably positionable as a unit in the plug opening, the base frame assembly comprising:
(1) a lower base frame section having a profile that removably fits into the plug opening, the lower base frame section having a cable opening therein adapted for alignment with the plug opening in the cover plate, and bendable clips on the lower base frame section arranged to unlock the lower base frame section from and snap-lock the section into the plug opening,
(2) an above-ground lower base structure rigidly affixed to the lower base frame section, the lower base structure positioned above the cable opening in the lower base frame section,
(3) a base plate rigidly affixed to an upper portion of the lower base structure and spaced above the cable opening, and
(4) a plurality of sealed openings in the base plate for providing sealed passage of active fiber optic cables passing from the grade level box and through the cable opening in the lower base frame section;

an upright rigid support bar removably secured to the base plate on a side thereof opposite the cable opening;
an optical fiber splicing device carried on the upright support bar to facilitate joining optical fibers contained in selected ones of the active cables; and
an outer cover adapted for removably fastening to the lower base structure for providing a sealed interior region for containing the active cables and the optical fiber splicing device;
the lower base frame section adapted to unlock from its position in the plug opening for use in removing the base frame assembly as a unit from the plug opening, with the active fiber optic cables undisturbed, to facilitate transporting the base frame assembly and the optical fiber splicing device to a remote work site for use in making above-ground optical fiber splice connections to the active cables passing from a slack condition in the grade level box, through the lower base structure, and to the optical fiber splicing device;
the base frame assembly and the optical fiber splicing device adapted to be transported away from the work site as a unit, with the active cables undisturbed, and repositioned in the plug opening by snap-locking the lower base frame section thereof into the plug opening in the cover plate.

8. The fiber distribution enclosure unit according to claim 7, in which the lower base structure includes an access door above the cable opening and below the base plate to provide access to the cable opening in the lower base frame section and to the sealed openings in the base plate.

9. The fiber distribution enclosure unit according to claim 7, in which the sealed openings in the base plate are adapted for sealing to fiber optic cables that include a main distribution cable and a smaller-sized optical fiber cable.

10. The fiber distribution enclosure unit according to claim 7, in which the lower base frame section is a one-piece unit.

11. The fiber distribution enclosure unit according to claim 7, in which the base plate includes a socket for removably receiving the support bar.

12. A method for making remote fiber optic cable splices in an underground utility enclosure assembly comprising a grade level box containing below-ground fiber optic cables stored in a slack condition, and a removable cover plate on the box, a section of the cover plate on the box including a plug opening adapted to receive a removable plug for forming a section of a traction surface atop the box, the plug opening, with the plug removed therefrom, providing access to the cables contained in the box, the method comprising:

providing a base frame assembly removably positionable as a unit in the plug opening, the base frame assembly comprising:
(1) a lower base frame section removably fitted into the plug opening, the lower base frame section having a cable opening therein aligned with the plug opening in the cover plate, and bendable clips on the lower base frame section that unlock the lower base frame section from and snap-lock the section into the plug opening,
(2) an above-ground lower base structure rigidly affixed to the lower base frame section, the lower base structure positioned above the cable opening in the lower base frame section,
(3) a base plate rigidly affixed to an upper portion of the lower base structure and spaced above the cable opening, and
(4) a plurality of sealed openings in the base plate providing sealed passage of active fiber optic cables passing from the grade level box and through the cable opening in the lower base frame section;

providing an upright rigid support bar removably secured to the base plate on a side thereof opposite the cable opening;
securing an optical fiber splicing device to the upright support bar to facilitate joining the optical fibers of selected ones of the active fiber optic cables;
removably fastening an outer cover to the lower base structure for providing a sealed interior region for containing the active cables and the optical fiber splicing device;
removing the lower base frame section from the plug opening and removing the base frame assembly, as a unit, from its position in the plug opening and transporting the assembly and the optical fiber splicing device, with the active fiber optic cables undisturbed, to a remote work site, and at the remote work site, making above-ground optical fiber splice connections to the active cables passing from a slack condition in the grade level box, through the lower base structure, and to the optical cable splicing device;
thereafter transporting the base frame assembly and the optical fiber splicing device away from the work site with the active cables undisturbed; and
removably securing the base frame assembly to the cover plate by snap-locking the lower base frame section thereof into the plug opening in the cover plate.

13. The method according to claim 12, in which the optical fiber splicing device comprises one or more fiber splice trays.

14. The method according to claim 12, in which at least a portion of the cover plate has a traction surface at ground level.

* * * * *